US012710611B2

(12) United States Patent
Eriksen

(10) Patent No.: US 12,710,611 B2
(45) Date of Patent: Aug. 18, 2026

(54) OPTICAL FIBER DISTRIBUTION DEVICE WITH IDENTIFIERS

(71) Applicant: PPC BROADBAND, INC., East Syracuse, NY (US)

(72) Inventor: Kim Lundgren Eriksen, Tappernøje (DK)

(73) Assignee: PPC BROADBAND, INC., East Syracuse, NY (US)

( * ) Notice: Subject to any disclaimer, the term of this patent is extended or adjusted under 35 U.S.C. 154(b) by 604 days.

(21) Appl. No.: 18/091,914

(22) Filed: Dec. 30, 2022

(65) Prior Publication Data

US 2023/0213720 A1 Jul. 6, 2023

Related U.S. Application Data

(60) Provisional application No. 63/295,649, filed on Dec. 31, 2021.

(51) Int. Cl.
*G02B 6/00* (2006.01)
*G02B 6/44* (2006.01)

(52) U.S. Cl.
CPC ......... *G02B 6/4454* (2013.01); *G02B 6/4452* (2013.01)

(58) Field of Classification Search
CPC ....... G02B 6/4454; G02B 6/4452; G02B 6/00
See application file for complete search history.

(56) References Cited

U.S. PATENT DOCUMENTS 6,434,313 B1 * 8/2002 Clapp, Jr. ............ G02B 6/4442 385/137
2012/0301098 A1 11/2012 Benedetto et al.
2014/0348480 A1 * 11/2014 Giraud ................. G02B 6/4454 385/135
2021/0396944 A1 * 12/2021 Ma ..................... G02B 6/44526

FOREIGN PATENT DOCUMENTS

EP 3258302 A1 12/2017
EP 3855222 A1 7/2021

OTHER PUBLICATIONS

International Search Report and Written Opinion mailed May 3, 2023 in corresponding International Application No. PCT/US2022/054374, 12 pages.

* cited by examiner

*Primary Examiner* — Jennifer Doan
(74) *Attorney, Agent, or Firm* — MH2 TECHNOLOGY LAW GROUP LLP

(57) ABSTRACT

An optical fiber distribution device may include a plurality of splice cassette portions that are configured with a plurality of identifiers for visually identifying the splice cassette portions. Each of the splice cassette portions may include a body that may be configured with a splice cassette tray portion receiving portion, a splice cassette tray portion that may be configured to be received within the splice cassette tray portion receiving portion, a first splice cassette tray identifier that may be configured to provide a first visual splice cassette tray identification, and a second splice cassette tray identifier that may be configured to visually distinguish between splice cassette trays having a same first splice cassette tray identifier.

29 Claims, 7 Drawing Sheets

OPTICAL FIBER DISTRIBUTION DEVICE WITH IDENTIFIERS

CROSS REFERENCE TO RELATED APPLICATION

This application claims the benefit of U.S. Provisional Application No. 63/295,649, filed Dec. 31, 2021, the disclosure of which is hereby incorporated by reference herein in its entirety.

BACKGROUND

The present invention relates generally to an optical fiber distribution device. More particularly, the present invention relates to a splice cassette holder with a plurality of splice cassettes, wherein each of the splice cassettes is configured to retain a splice cassette tray with identifiers or designators for identifying fibers associated with each of the splice cassette trays.

Fiber optic cables or other cables are often used as a medium for telecommunication and computer networking. A fiber distribution assembly or device may be a splice cassette assembly or device is often used to organize and manage fiber optic cables or connections within telecommunication wiring enclosures. An example splice cassette assembly or device may include a plurality of splice cassettes (also sometimes referred to as fiber optic cassettes).

The splice cassettes are configured to allow the routing of fiber optic cables within the splice cassettes such that individual optical fibers (or optical fiber cables) may be spliced to other optical fibers to make a desired connection. The splice cassette device may include external connectors for connection to the individual spliced optical fibers. A typical splice cassette device may include areas to segregate the spliced fibers. The cassettes may include a large number of spliced optical fibers, and each splice cassette assembly may include a large number of splice cassettes, which may make it difficult to locate specific optical fibers for connection or disconnection such as by splicing.

It may be desirable to provide a splice cassette and/or a splice cassette device or assembly that overcomes one or more of the aforementioned disadvantages of typical splice cassette devices. That is, it may be desirable to provide a splice cassette having visual identification of optical fiber within the splice cassettes of a splice cassette device or assembly.

SUMMARY

In accordance with various embodiments of the present disclosure, an optical fiber distribution device provides a visual identification of fiber optic cables associated with splice cassette portions. The device includes a splice cassette portion having a splice cassette tray receiving portion, a splice cassette tray portion configured to be received by the splice cassette tray receiving portion, wherein the splice cassette tray portion includes a first splice cassette tray portion identifier that is configured to provide a first visual identification of a fiber optic cable that is spliced and retained at the splice cassette tray portion, and wherein the splice cassette tray portion includes a second splice cassette tray portion identifier that is configured to provide a second visual identification different from the first visual identification of the fiber optic cable that is spliced and retained at the splice cassette tray.

In accordance with various embodiments of the present disclosure, an optical fiber distribution device provides a visual identification of fiber optic cables associated with splice cassette portions. The device includes a splice cassette portion having a splice cassette tray receiving portion, a splice cassette tray portion configured to be received by the splice cassette tray receiving portion, wherein the splice cassette tray portion includes a splice retaining portion that is configured to retain a spliced portion of a fiber optic cable, wherein the splice cassette tray portion includes a first splice cassette tray portion identifier that is configured to provide a first visual identification of a fiber optic cable that is spliced and retained at the splice cassette tray portion, wherein the splice cassette tray portion includes a second splice cassette tray portion identifier that is configured to provide a second visual identification different from the first visual identification of the fiber optic cable that is spliced and retained at the splice cassette tray, and wherein the splice cassette tray portion includes a third splice cassette tray portion identifier.

In accordance with various embodiments of the present disclosure, an optical fiber distribution device provides a visual identification of fiber optic cables associated with splice cassette portions. The device includes a plurality of splice cassette portions configured to be mounted to a base portion, wherein each splice cassette portion of the plurality of splice cassette portions comprises a body portion having a splice cassette tray receiving portion, wherein the splice cassette tray receiving portion is configured to receive a splice cassette tray portion, wherein the splice cassette tray portion includes a splice retaining portion that is configured to retain a spliced portion of a fiber optic cable, wherein the splice cassette tray portion includes a first splice cassette tray portion identifier that is configured to provide a first visual identification of a fiber optic cable that is spliced and retained at the splice cassette tray portion, wherein the splice cassette tray portion includes a second splice cassette tray portion identifier different from the first visual identification that is configured to provide a second visual identification of the fiber optic cable that is spliced and retained at the splice cassette tray, wherein the first fiber splice cassette tray portion identifier comprises a color of the splice cassette tray portion that matches a color of the fiber optic cable that is spliced and retained at the splice cassette tray portion, wherein the second fiber splice cassette tray portion identifier comprises an indicia on the splice cassette tray portion that distinguishes a first fiber splice cassette tray portion of a first color from a second fiber splice cassette tray of the first color, wherein the splice cassette tray portion is configured to include a front surface portion that is inclined relative to an adjacent front surface portion of the body portion so as to provide the front surface portion of the splice cassette portion with an increased surface area relative to the adjacent front surface portion of the body portion for displaying a third splice cassette tray portion identifier, and wherein the first splice cassette tray portion identifier and the second splice cassette tray identifier are configured to provide the first visual identification and the second visual identification of the fiber optic cable that is spliced and retained at the splice cassette tray portion even when the splice cassette tray is overlapped by another splice cassette tray such that the fiber optic cable that is spliced and retained at the splice cassette tray is not visible.

Various aspects of the splice cassette assembly, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Figure 1:
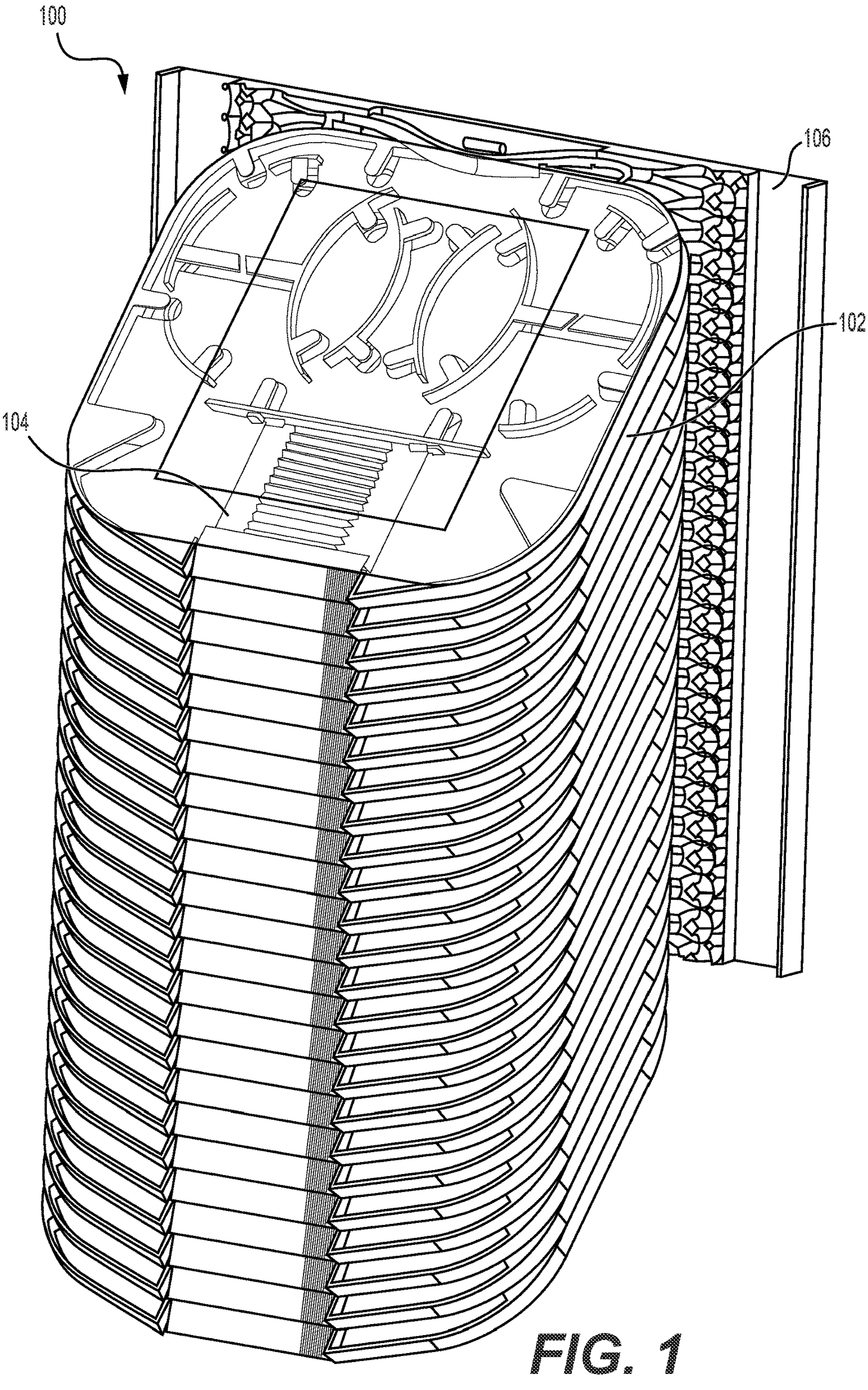
FIG. 1 is a perspective view of a splice cassette assembly in accordance with disclosed aspects.

Referring first to FIG. 1, an optical fiber distribution device or assembly. In some embodiments, the optical fiber distribution device may be a splice cassette device or splice cassette portion 100. The splice cassette device 100 is configured to contain one or a plurality of splice cassettes or splice cassette portions 102. FIG. 1 illustrates the splice cassette device 100 with twenty-four splice cassettes 102, although any number of splice cassettes 102 could be used. The splice cassettes 102 may be mounted to the panel or base portion 106. The splice cassette device 100 is configured to receive optical fiber cables containing optical fibers from a panel or panels 106, (also referred to as base portion 106) although the panel could be omitted. Each optical fiber cable or individual optical fiber may be spliced to other optical fibers, and the other end of the spliced optical fibers may be routed to an area outside of the splice cassette device 100. In some embodiments, the optical fibers may be fibers from a multi-fiber distribution cable. Such a multi-fiber distribution cable may include a plurality of fibers, wherein each fiber comprises a different color relative to the other fibers of the distribution cable.

The splice cassettes 102 may be mounted to the panel or base portion 106. In some embodiments, the splice cassettes 102 may be mounted to the base portion 106 in a stacked configuration. In such a stacked configuration, only a front-end portion of the splice cassettes 102 may be visible (except for a top splice cassette 102) due to the overlapping of the splice cassettes 102. In some embodiments, the splice cassettes 102 may be removable from the base portion 106 and may be mounted to the base portion 106 in a pivotable manner.

Figure 2:
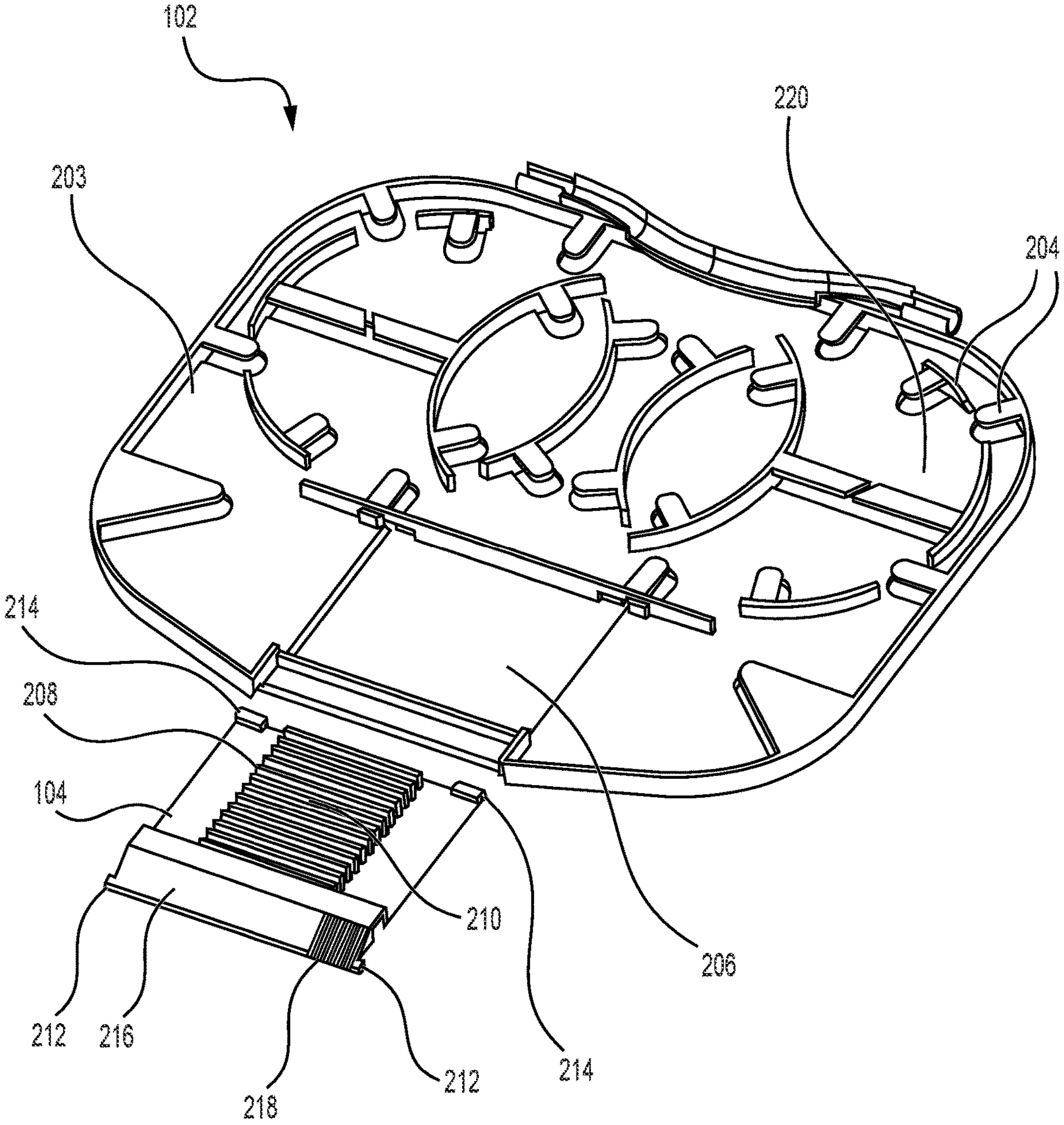
FIG. 2 is a perspective view of a splice cassette and a splice cassette tray in accordance with disclosed aspects.
Figure 3:
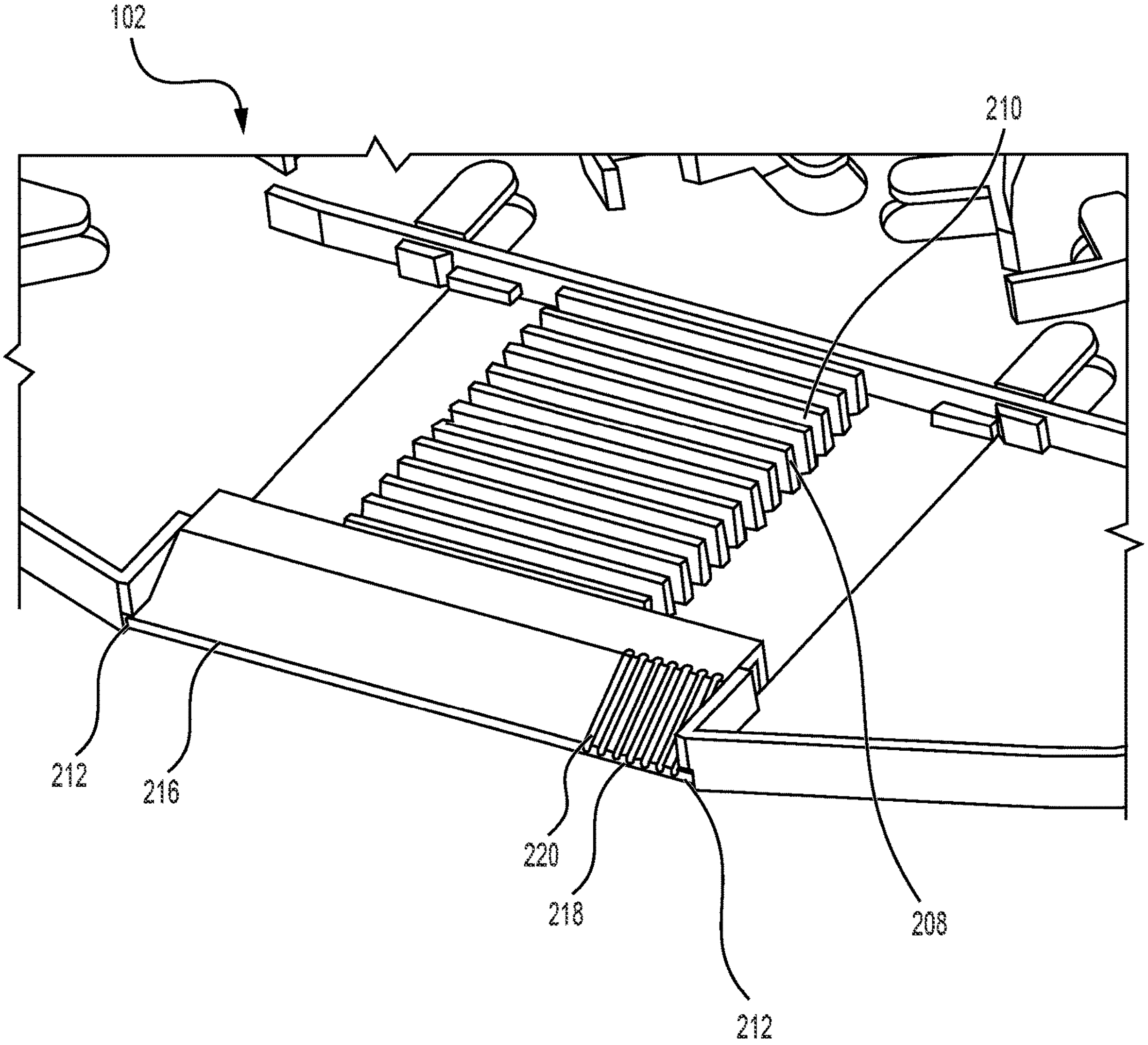
FIG. 3 is a perspective view of a splice cassette and a splice cassette tray in accordance with disclosed aspects.
Figure 4:
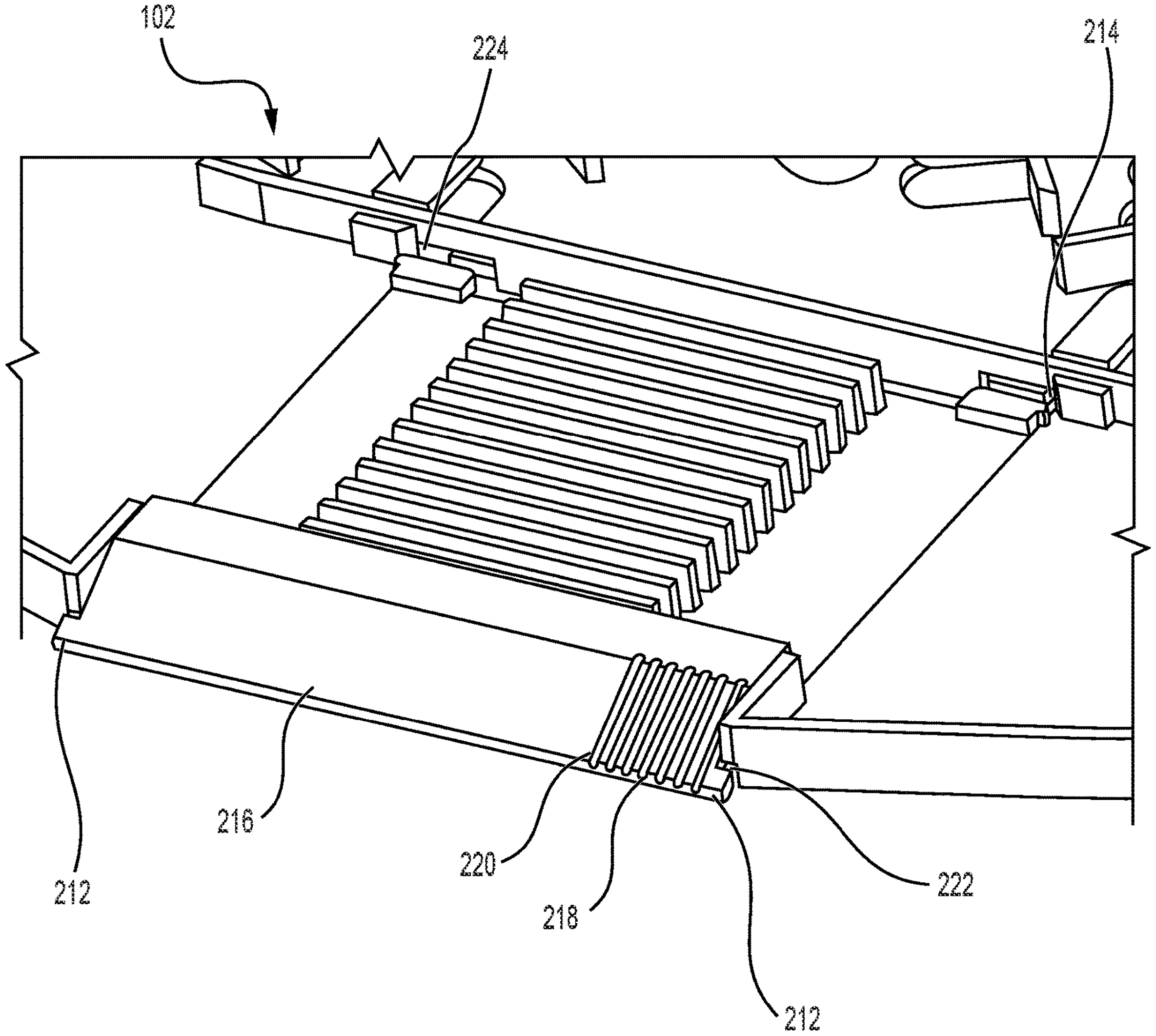
FIG. 4 is a perspective view of a splice cassette and a splice cassette tray in accordance with disclosed aspects.
Figure 5:
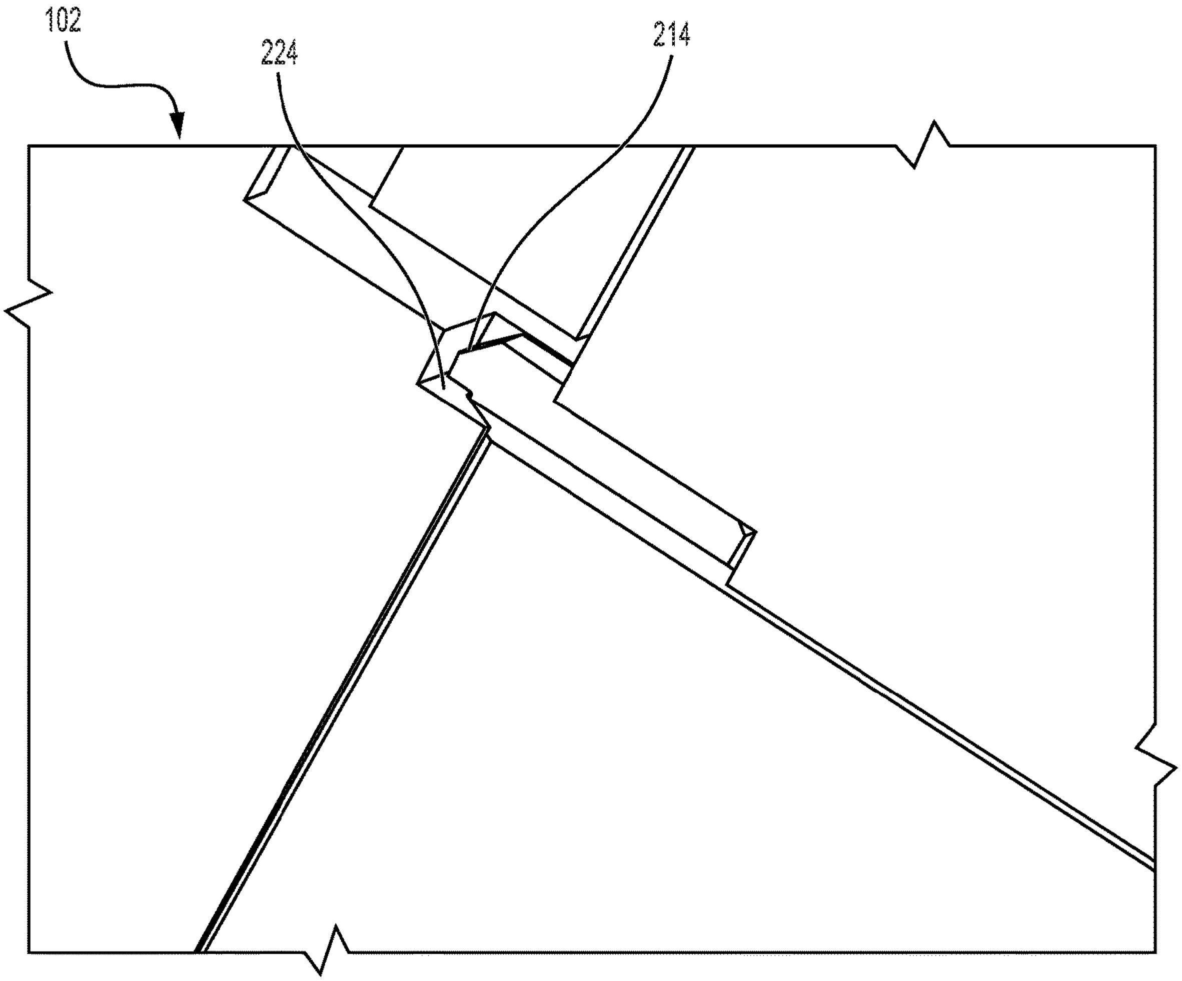
FIG. 5 is a partial perspective rear view of a splice cassette and a splice cassette tray in accordance with disclosed aspects.

As illustrated in FIG. 2, each of the splice cassettes 102 may include a splice cassette body or splice cassette body portion 203, and a splice cassette tray receiving portion 206 configured to receive a splice cassette tray 104. The splice cassette 102 may also include a fiber management portion 204 for retaining fiber optical cables (not shown) at various positions within the splice cassette 102. The splice cassette tray 104 may also include splice retaining portions 208, which are further described herein. In some embodiments, the splice cassette tray 104 can be removed from the receiving portion 206.

Each of the splice cassette tray 104 is interchangeable with other splice cassette trays 104 and each of the splice cassette trays 104 may be placed within any of the splice cassettes 102. The splice cassette tray 104 includes one or more splice retaining portions 208 configured to retain a splice of fiber optic cables. In some embodiments, the splice retaining portions may be configured as a plurality of parallel walls 208, with a splice receiving space 210 between each adjacent pair of walls 208. The splice receiving space 210 may be configured with a width to receive and retain a spliced fiber optic cable or fiber optic wire between adjacent ones of the walls 208. Thirteen walls 208 are illustrated in the figures herein in the splice cassette tray 104, although other numbers of walls 208 may be used in various embodiments. Additionally, structure other than the parallel walls and splice receiving space 210 may be used as the splice retaining portions 208.

In some embodiments, each splice cassette tray 104 is configured with retaining portions for retaining the splice cassette tray 104 in the splice cassette 102, as illustrated in FIGS. 2-5. The retaining portions of the splice cassette tray 104 may include first projections 212 protruding from front lower side portions of the splice cassette tray 104 and second projections 214 protruding from rear upper side portions of the splice cassette tray 104. Other retaining portions for retaining the splice cassette tray 104 in the splice cassette 102 may be used with the disclosed embodiments.

In some embodiments, the splice cassette 102 may be configured with front indentations or receiving portions 222 which are configured to receive the first projections 212 of the splice cassette tray 104. In some embodiments, the splice cassette 102 is also configured with rear indentations or receiving portions 224 which are configured to receive the second projections 214 of the splice cassette tray 104. Retaining portions other than those shown here could be utilized with the splice cassette assembly 100 in accordance with various embodiments.

In some embodiments, the splice cassette tray 104 includes a front surface 216 that may be disposed at an inclined angle with respect to a top or front surface of the splice cassette device 102. The inclined angle is configured to increase a surface area of the front surface 216 of the splice cassette tray 104. The increased surface area of the front surface 216 of the splice cassette tray 104 allows additional information to be displayed on the front surface 216, as a third identifier for identification purposes of the splice cassette tray 104 or other identification, such as which fiber optic cables are disposed therein, where the fiber optic cables are connected to, services that are provided by the spliced fiber optic cable, any combination of such identification, etc.

In some embodiments, the splice cassette trays 104 may each have one of a plurality of different colors to present visual identification as a visual color identifier or designator. For example, the splice cassette trays 104 may be blue, red, yellow, green, brown, etc. The color identifier can be used to distinguish the splice cassette trays 104 from each other as a splice cassette tray identifier, or to differentiate which splice cassette trays 104 have particular fiber optical cables disposed therein. Thus, the color identifier may be configured as a splice cassette tray identifier, or as a fiber optic cable identifier, or both. For example, a blue splice cassette tray may be used to indicate that the blue cassette tray has a blue fiber optic cable disposed therein. In such embodiments, the blue fiber optic cable may include a blue designator on the fiber optic cable. In some embodiments, the splice cassette trays 104 may additionally or in place of the color identifier include symbols, abbreviations, and/or other alpha/numeric identifiers. For example, instead of a color identifier or designator, the splice cassette tray 104 could include a numeric, alpha numeric or other identifier instead of the color identifier. In these embodiments, the fiber optic cable within the splice cassette tray 104 may also include a corresponding numeric, alpha numeric or other identifier or designator.

In some embodiments, the tray colors can correspond to matching fiber cable color. Or alternatively, the colors may not match, but each color tray can still be used as the first identifier for a particular colored cable and the second identifier can be used to identify a second colored cable having the same color.

Additionally, in some embodiments, the splice cassette trays 104 may include a second visual indicator or designator, such as, for example, grooves or groove portions 218. The grooves 218 may be configured to act as a second splice cassette tray identifier or designator when the colors (or first identifiers) of the splice cassette trays may repeat on more than one of the splice cassettes 104. For example, in FIG. 1 there may be three different brown splice cassette trays 104, three different blue splice cassette trays 104, three different red splice cassette trays 104, and four different yellow splice cassette trays 104 within one optical fiber distribution device 100. The grooves 218 may be marked with an indicator or designator 220 as a second identifier, such as a stripe or other visual identifier, to visually distinguish the splice cassette trays having a same first identifier from each other. The indicator 220 may be a second splice cassette tray identifier.

In some embodiments, the second indicator 220 may be used to differentiate between splice cassette trays 104 of the same color or having a same first identifier or designator. For example, with three splice cassette trays having a brown color as a first splice cassette tray identifier and/or a first fiber optic cable identifier, each of the brown splice cassette trays may be marked with a different second indicator or designator 220, to differentiate between the different brown splice cassette trays. This may be accomplished with the indicators being stripes with one stripe, two stripes, and three stripes on the different brown splice cassette trays 102, for example. The second splice cassette tray identifier may be embodied in structure other than the grooves and stripes, such as tabs, text that can be added, a number of holes in the grooves that can be created, etc.

In some embodiments, the splice cassette trays 104 may be configured to be inserted into the splice cassette 102 and retained therein using the retaining elements. In some embodiments, the splice cassette trays 104 may be removable from the splice cassettes 102. For example, in some embodiments the first and second protrusions 212, 214 may be provided with some degree of flexibility, so that the protrusions 212, 214 may be able to move inwardly when an amount of force is applied to insert the splice cassette trays 104 into the splice cassettes 102, and to move outwardly when an amount of force is applied to remove the splice cassette trays 104 from the splice cassettes 102. Any other methods and structures of making the splice cassette trays removeable from the splice cassettes 102 may be utilized with the disclosed embodiments.

Figure 6:
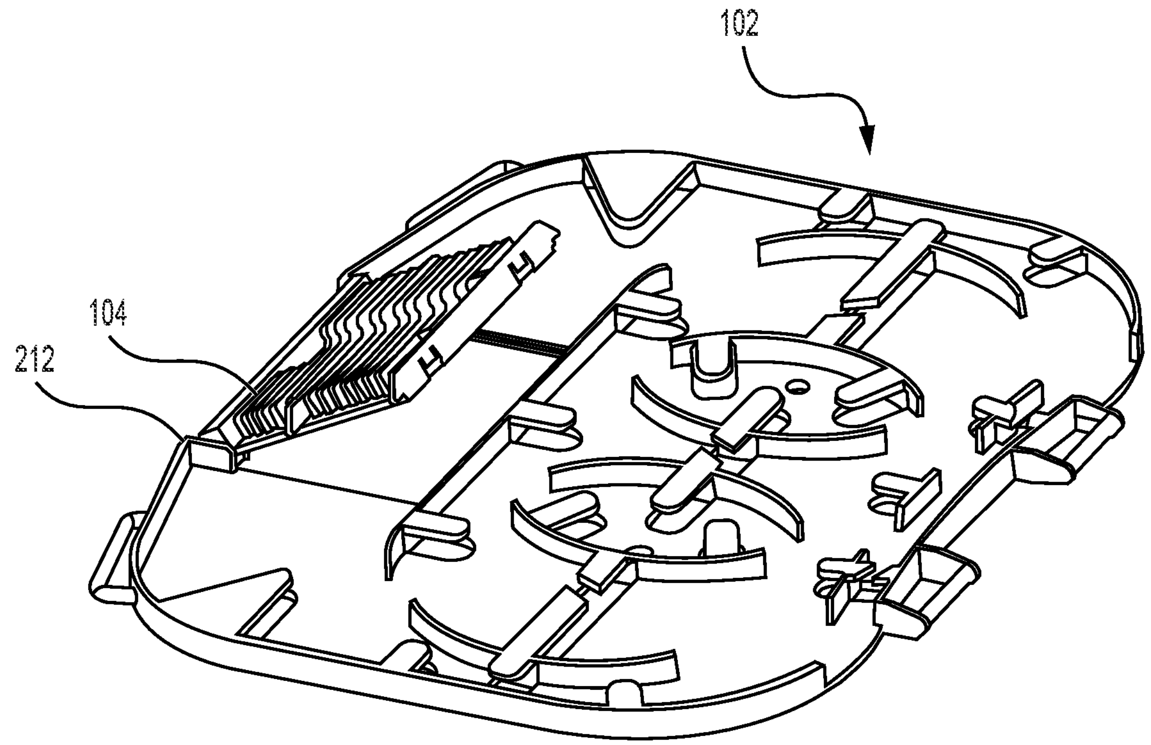
FIG. 6 is a perspective review of a splice cassette and a splice cassette tray in accordance with disclosed aspects.

As illustrated in FIG. 6, in some embodiments, the splice cassette tray 104 may be rotated upwards around the connections of the first projections 212 to the splice cassette 102.

Figure 7:
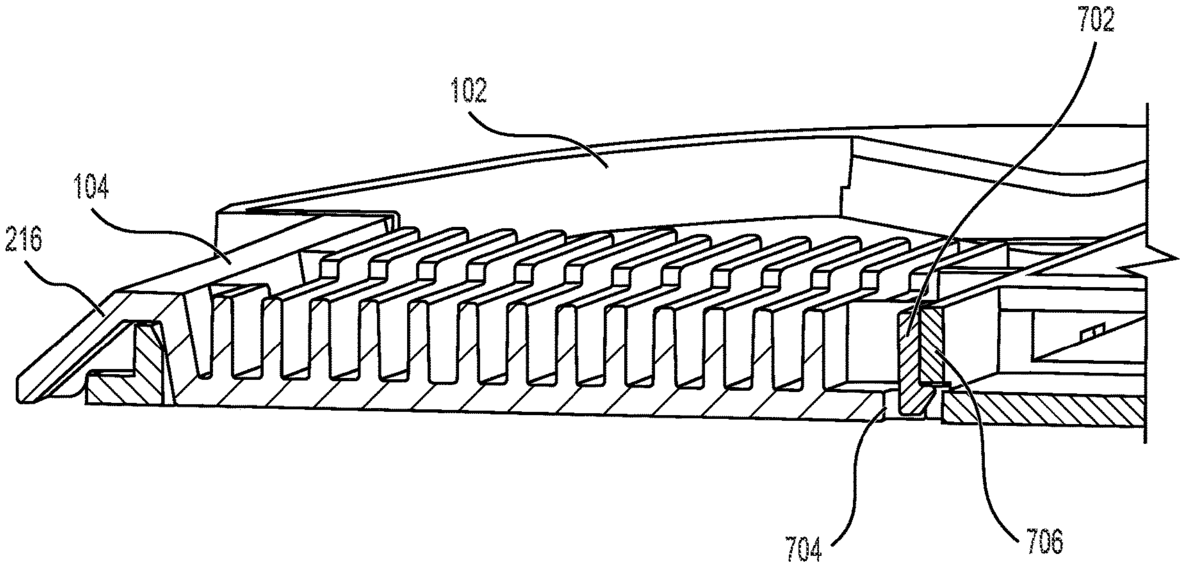
FIG. 7 is a perspective review of a splice cassette and a splice cassette tray in accordance with disclosed aspects.

As illustrated in FIG. 7, in some embodiments, the splice cassette tray 104 may include alternate structure for retaining the splice cassette tray in a down or closed position. In particular, the splice cassette 102 may include projections 702 configured to be received within a receiving portion on the splice cassette tray 104, where the receiving portion is formed as a groove between a front wall 704 and a rear wall 706. Other configurations to make the splice cassette tray 104 removeable and/or pivotable with respect to the splice cassette 102 are within the scope of the various embodiments.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. An optical fiber distribution device that provides a visual identification of fiber optic cables associated with splice cassette portions comprising:

a plurality of splice cassette portions configured to be mounted to a base portion;

wherein each splice cassette portion of the plurality of splice cassette portions comprises a body portion having a splice cassette tray receiving portion;

wherein the splice cassette tray receiving portion is configured to receive a splice cassette tray portion;

wherein the splice cassette tray portion includes a splice retaining portion that is configured to retain a spliced portion of a fiber optic cable;

wherein the splice cassette tray portion includes a first splice cassette tray portion identifier that is configured to provide a first visual identification of a fiber optic cable that is spliced and retained at the splice cassette tray portion;

wherein the splice cassette tray portion includes a second splice cassette tray portion identifier different from the first visual identification that is configured to provide a second visual identification of the fiber optic cable that is spliced and retained at the splice cassette tray portion;

wherein the first fiber splice cassette tray portion identifier comprises a color of the splice cassette tray portion that matches a color of the fiber optic cable that is spliced and retained at the splice cassette tray portion;

wherein the second fiber splice cassette tray portion identifier comprises an indicia on the splice cassette tray portion that distinguishes a first fiber splice cassette tray portion of a first color from a second fiber splice cassette tray portion of the first color;

wherein the splice cassette tray portion is configured to include a front surface portion that is inclined relative to an adjacent front surface portion of the body portion so as to provide the front surface portion of the splice cassette portion with an increased surface area relative to the adjacent front surface portion of the body portion for displaying a third splice cassette tray portion identifier; and wherein the first splice cassette tray portion identifier and the second splice cassette tray portion identifier are configured to provide the first visual identification and the second visual identification of the fiber optic cable that is spliced and retained at the splice cassette tray portion even when the splice cassette tray portion is overlapped by a second splice cassette tray portion such that the fiber optic cable that is spliced and retained at the splice cassette tray portion is blocked from view by the second splice cassette tray portion.

2. The device of claim 1, wherein the second splice cassette tray portion identifier is configured as one or more marked stripes to visually distinguish between splice cassette tray portions having a same first splice cassette tray portion identifier.

3. The device of claim 1, wherein the second splice cassette tray portion identifier is configured as a series of selectable tabs, text or a number of holes on the inclined front surface of the splice cassette tray portion.

4. The device of claim 1, wherein the third splice cassette tray portion identifier is configured to visually identify at least one of a designation of the fiber optic cables disposed within the splice cassette portion, an external location of a connection of the fiber optic cables, or services that are provided by the fiber optic cables.

5. The device of claim 1, wherein the splice cassette tray portion is removable from the splice cassette portion.

6. The device of claim 1, wherein the splice retaining portion comprises a plurality of walls separated by a splice receiving space.

7. An optical fiber distribution device that provides a visual identification of fiber optic cables associated with splice cassette portions comprising:

a splice cassette portion having a having a body portion and a splice cassette tray portion receiving portion;

a splice cassette tray portion configured to be received by the splice cassette tray receiving portion;

wherein the splice cassette tray portion includes a splice retaining portion that is configured to retain a spliced portion of a fiber optic cable;

wherein the splice cassette tray portion includes a first splice cassette tray portion identifier that is configured to provide a first visual identification of a fiber optic cable that is spliced and retained at the splice cassette tray portion;

wherein the splice cassette tray portion includes a second splice cassette tray portion identifier that is configured to provide a second visual identification different from the first visual identification of the fiber optic cable that is spliced and retained at the splice cassette tray portion;

wherein the splice cassette tray portion includes a third splice cassette tray portion identifier; and wherein the splice cassette tray portion is configured to include a front surface portion that is inclined relative to an adjacent front surface portion of the body portion so as to provide the front surface portion of the splice cassette portion with an increased surface area relative to the adjacent front surface portion of the body portion for displaying the third splice cassette tray portion identifier.

8. The device of claim 7, wherein the first splice cassette tray portion identifier is configured as a color of the splice cassette tray portion.

9. The device of claim 7, wherein the first splice cassette tray portion identifier is configured as a textual, numeric or alphanumeric identifier.

10. The device of claim 7, wherein the second splice cassette tray portion identifier is configured as one or more marked stripes to visually distinguish between splice cassette tray portions having a same first splice cassette tray portion identifier.

11. The device of claim 7, wherein the second splice cassette tray portion identifier is configured as a series of selectable tabs, text or a number of holes on the inclined front surface of the splice cassette tray portion.

12. The device of claim 7, wherein the third splice cassette tray portion identifier is configured to visually identify at least one of a designation of the fiber optic cables disposed within the splice cassette, an external location of a connection of the fiber optic cables, or services that are provided by the fiber optic cables.

13. The device of claim 7, wherein the splice cassette tray portions are removable from the splice cassette.

14. The device of claim 7, wherein the splice retaining portion comprises a plurality of walls separated by a splice receiving space.

15. An optical fiber distribution device that provides a visual identification of fiber optic cables associated with splice cassette portions comprising:

a splice cassette portion having a body portion and a splice cassette tray portion receiving portion;

a splice cassette tray portion configured to be received by the splice cassette tray portion receiving portion;

wherein the splice cassette tray portion includes a first splice cassette tray portion identifier that is configured to provide a first visual identification of a fiber optic cable that is spliced and retained at the splice cassette tray portion;

wherein the splice cassette tray portion includes a second splice cassette tray portion identifier that is configured to provide a second visual identification different from the first visual identification of the fiber optic cable that is spliced and retained at the splice cassette tray portion; and wherein the splice cassette tray portion is configured to include a front surface portion that is inclined relative to an adjacent front surface portion of the body portion so as to provide the front surface portion of the splice cassette portion with an increased surface area relative to the adjacent front surface portion of the body portion.

16. The device of claim 15, wherein the first splice cassette tray portion identifier is configured as a color of the splice cassette tray portion.

17. The device of claim 15, wherein the first splice cassette tray portion identifier is configured as a textual, numeric or alphanumeric identifier.

18. The device of claim 15, wherein the second splice cassette tray portion identifier is configured as one or more marked stripes to visually distinguish between splice cassette tray portions having a same first splice cassette tray portion identifier.

19. The device of claim 15, wherein the second splice cassette tray portion identifier is configured as a series of selectable tabs, text or a number of holes on the inclined front surface of the splice cassette tray portion.

20. The device of claim 15, wherein the splice cassette tray portion includes a third splice cassette tray portion identifier, and the third splice cassette tray portion identifier is configured to visually identify at least one of a designation of the fiber optic cables disposed within the splice cassette, an external location of a connection of the fiber optic cables, or services that are provided by the fiber optic cables.

21. The device of claim 20, wherein the third splice cassette tray portion identifier is configured to visually identify at least one of a designation of the fiber optic cables disposed within the splice cassette, an external location of a connection of the fiber optic cables, or services that are provided by the fiber optic cables.

22. The device of claim 15, wherein the splice cassette tray portions are removable from the splice cassette.

23. The device of claim 15, wherein the splice retaining portion comprises a plurality of walls that are each separated by a splice receiving space.

24. An optical fiber distribution device for providing an enhanced visual identification of fiber optic cables associated with splice cassette portions comprising:

a splice cassette portion having a splice cassette tray portion receiving portion and having a body portion;

a splice cassette tray portion structured to be received by the splice cassette tray portion receiving portion;

wherein the splice cassette tray portion includes a first splice cassette tray portion identifier that is structured to provide a first visual identification of a fiber optic cable that is spliced and retained at the splice cassette tray portion;

wherein the splice cassette tray portion includes a second splice cassette tray portion identifier that is structured to provide a second visual identification different from the first visual identification of the fiber optic cable that is spliced and retained at the splice cassette tray portion; and wherein the splice cassette tray portion is structured and arranged to include a front surface portion that is inclined relative to an adjacent front surface portion of the body portion so as to provide the front surface portion of the splice cassette portion with an increased surface area relative to the adjacent front surface portion of the body portion to provide an enhanced visual identification of the fiber optic cable.

25. The device of claim 24, wherein the first splice cassette tray portion identifier is configured as a color of the splice cassette tray portion.

26. The device of claim 24, wherein the first splice cassette tray portion identifier is configured as a textual, numeric or alphanumeric identifier.

27. The device of claim 24, wherein the second splice cassette tray portion identifier is configured as one or more marked stripes to visually distinguish between splice cassette tray portions having a same first splice cassette tray portion identifier.

28. The device of claim 24, wherein the second splice cassette tray portion identifier is configured as a series of selectable tabs, text or a number of holes on the inclined front surface of the splice cassette tray portion.

29. The device of claim 24, wherein the splice cassette tray portion includes a third splice cassette tray portion identifier, and the third splice cassette tray portion identifier is configured to visually identify at least one of a designation of the fiber optic cables disposed within the splice cassette, an external location of a connection of the fiber optic cables, or services that are provided by the fiber optic cables.

* * * * *